INVENTOR.
RAY A. ECKLUND
BY
ATTORNEY

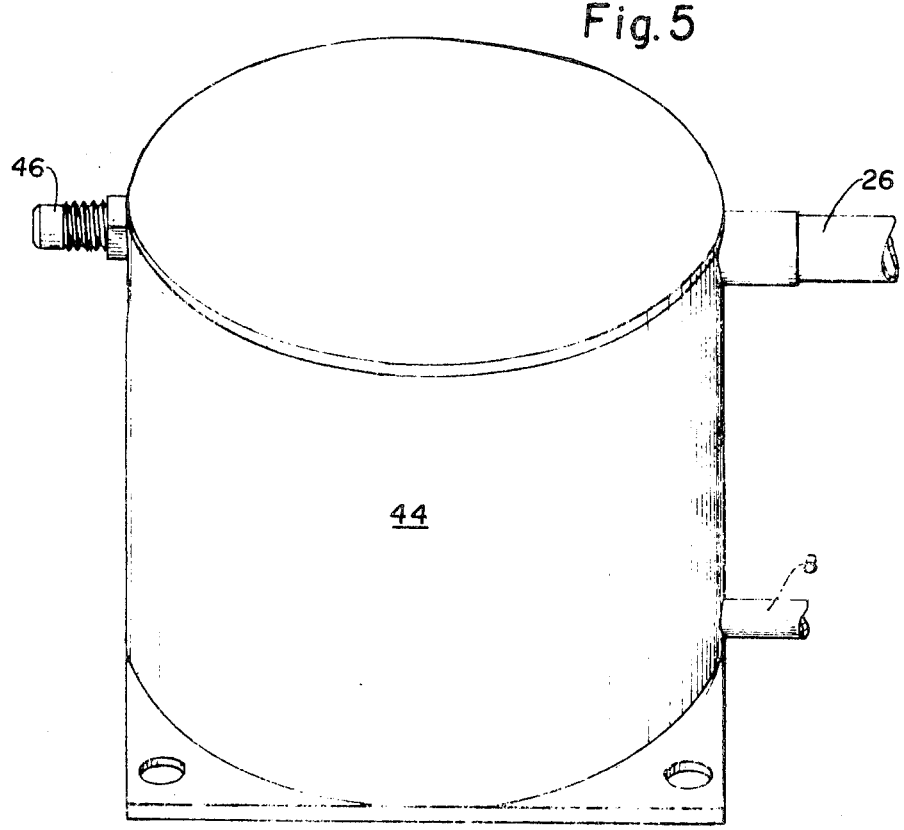
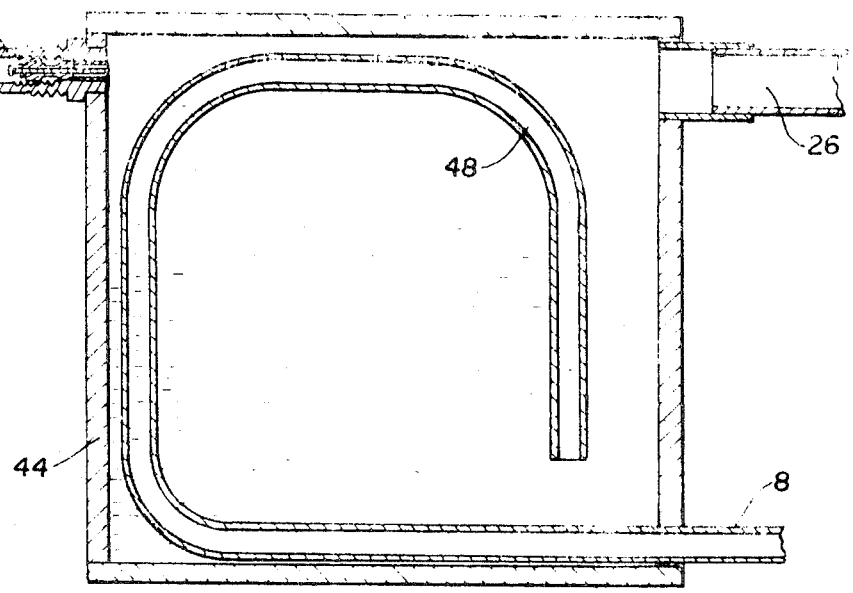

United States Patent Office 3,520,812
Patented July 21, 1970

3,520,812
REFRIGERANT COMPOSITION CONTAINING AMMONIA, ETHANOL, AND MINERAL OIL
Ray A. Ecklund, 160 E. Hurst Blvd., Hurst, Tex.
76053; Alvin G. Keller, trustee
Filed Feb. 16, 1968, Ser. No. 706,072
Int. Cl. C09k 3/06
U.S. Cl. 252—69                    1 Claim

ABSTRACT OF THE DISCLOSURE

This patent discloses a novel refrigerant composition useful at temperatures as low as —200° F., as well as methods and apparatus for using such composition. The advantage is taken of the properties of the composition to obtain refrigerating or air-conditioning equipment far more compact and efficient than anything hitherto known. The refrigerant is made by mixing mineral oil with ethanol to form crystals, which are then placed without agitation in cold household ammonia to form refrigerant liquid.

BACKGROUND OF THE INVENTION

Feld of the invention

This invention relates to refrigerants, to methods of producing temperatures in the vicinity of 0° F. to —200° F., and to apparatus for using the novel refrigerant of the invention.

Description of the prior art

Refrigeration systems are known in which ammonia is used as the refrigerant, the ammonia being repeatedly recirculated through a cycle that involves having the ammonia, as it issues from the evaporator where the cooling takes place, become absorbed in an ammonia-poor liquid, leading that liquid (now enriched in ammonia) to an evaporator, supplying heat in the evaporator to drive ammonia from the liquid into an exit pipe in which there is developed a rather high pressure of ammonia, cooling the ammonia in the exit pipe to cause it to condense (still under high pressure), and then leading the liquid high-pressure ammonia through an expansion valve to the evaporator, where the ammonia gasifies and expands, absorbing heat in this process. The ammonia-poor liquid generated in the evaporator within which ammonia-rich liquid is heated to drive off the ammonia is cooled by heat exchange with ammonia-rich liquid leaving the absorber, and then is supplied to the absorber. Known systems of this kind usually require a circulation pump to direct the liquid from the absorber to the evaporator in which ammonia gas is produced. Moreover, such systems do not effectively and efficiently produce temperatures in the range —50° F. to —200° F.; bulky equipment is required to reach such temperatures, if it can be done at all with an ammonia-water refrigerant system. Moreover, as a result of the failure of such systems to provide such supercold temperatures, there is the further difficulty that atmospheric moisture tends to condense and freeze upon the cooling fins, thereby substantially decrease the efficiency of the system.

BRIEF SUMMARY OF THE INVENTION

A refrigerant is made by mixing 2 parts by volume of mineral oil with 1 part volume of ethanol, these reacting at about 10 minutes to produce a crystalline substance. The crystalline substance is cooled to —40° F., and 1 part by volume of household ammonia (not less than 28% by volume of ammonia gas) is added, without agitation. Initially, the household ammonia sinks to the bottom, but within a short period of time, it rises and is absorbed by the above-mentioned crystals, yielding a liquid refrigerant composition. This refrigerant composition may be added to a conventional houshold refrigerant, replacing part of the refrigerant therein, and thereby substantially improving the efficiency of the conventional refrigerator, to the point where it will generate temperatures of about —50° F. to —100° F. When used by itself in apparatus designed as hereinafter taught, temperatures still lower, down to around —200° F., may be produced conveniently and economically. A system employing five quarts of refrigerant and drawing 50 watts of electrical current will produce a cooling effect equivalent to the melting of ten tons of ice per day, or enough to cool five two-story houses. The chief novel feature of the apparatus of the invention is the use of a Venturi line leaving the vicinity of the heating unit and running into the downcomer from the cooling coils, to accelerate the fluid therein, thereby yielding proper circulation of refrigerant without the use of pumps. The temperature reached and the proper functioning of the system is importantly dependent on the sizes of the various lines and valves used therein. With a system designed to yield a supercold temperature of —50° F. to —200° F., and with a proper quantity of air being passed over the cooling-coil fins, ice does not form on the cooling fins, and improved efficiency of operation is obtained.

BRIEF DESCRIPTION OF THE DRAWINGS

A complete understanding of the invention may be obtained from the foregoing and following description thereof, taken together with the appended drawings, in which:

FIG. 5 is a perspective view of one part of the apparatus shown in FIG. 1; and

FIG. 6 is a central vertical section view through the part shown in FIG. 5.

DESCRIPTION OF THE PREFERRED EMBODIMENTS

Making the refrigerant

To make enough refrigerant for a unit having a capacity of ten tons of refrigeration, ethanol (1.25 quarts) is added to mineral oil (2.5 quarts). The mineral oil comprises a petroleum feedstock fraction boiling higher than the gasolines but lower than lubricating oils, paraffin waxes and the like; the mineral oil sold commercially as a laxative is satisfactory. These ingredients are mixed at room temperature and permitted to stand for a suitable period of time, such as about ten minutes, during which time the ingredients react or combine to form a crystalline material. The crystalline material is then cooled to —40° F., and household ammonia containing not less than about 28% by volume of ammonia gas (1.25 quarts), also preferably at about —40° F. is added. Initially, the household ammonia sinks to the bottom, but after a short, but variable, period of time, it rises and is absorbed by the crystals mentioned above. This yields a milky or cloudy liquid, which comprises the refrigerant composition of the present invention.

The proportions of the ingredients must be rather strictly observed, within about plus or minus 5%, as otherwise proper mixing will not be obtained. It is also important that the crystals be cooled to —40° F. before the ammonia is added, and that agitation or stirring be substantially avoided while the household ammonia is being absorbed by the crystals to yield the product liquid refrigerant.

Refrigeration apparatus

Figure 1:
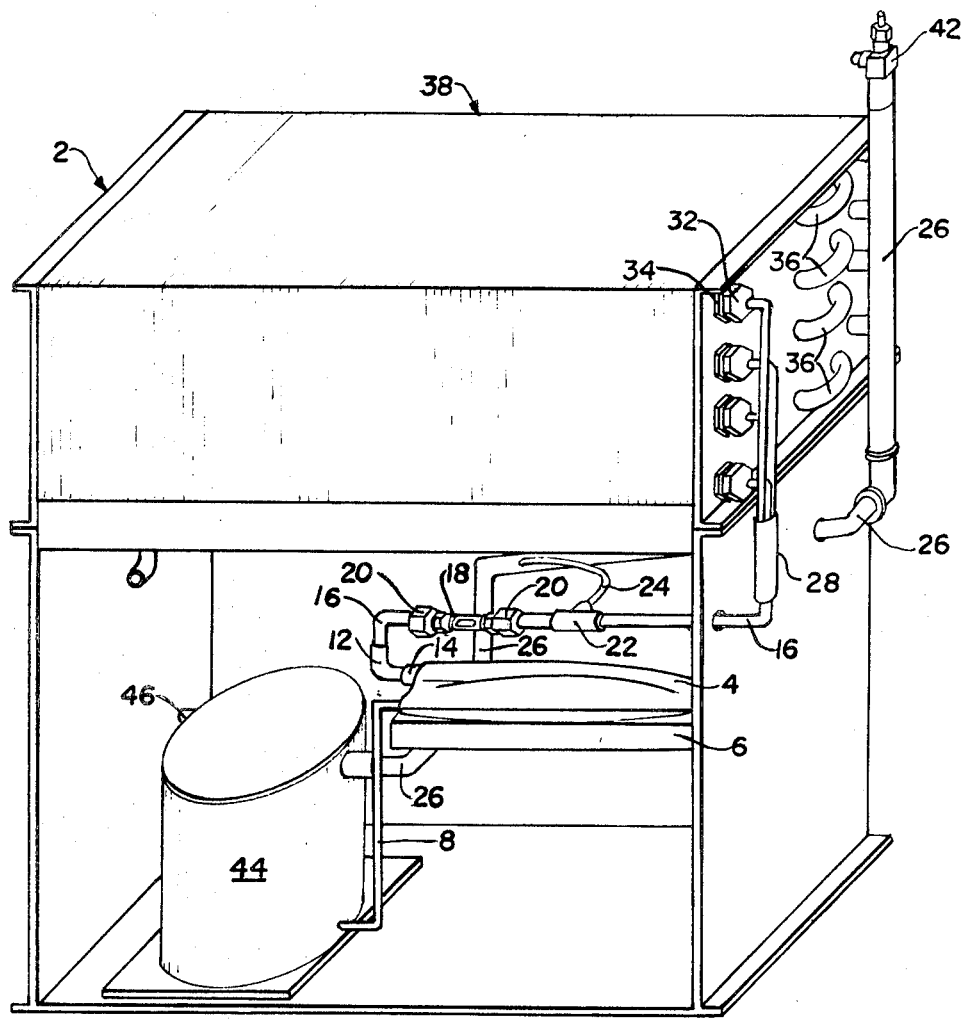
FIG. 1 is a perspective view of apparatus in accordance with the invention.
Figures 2, 3:
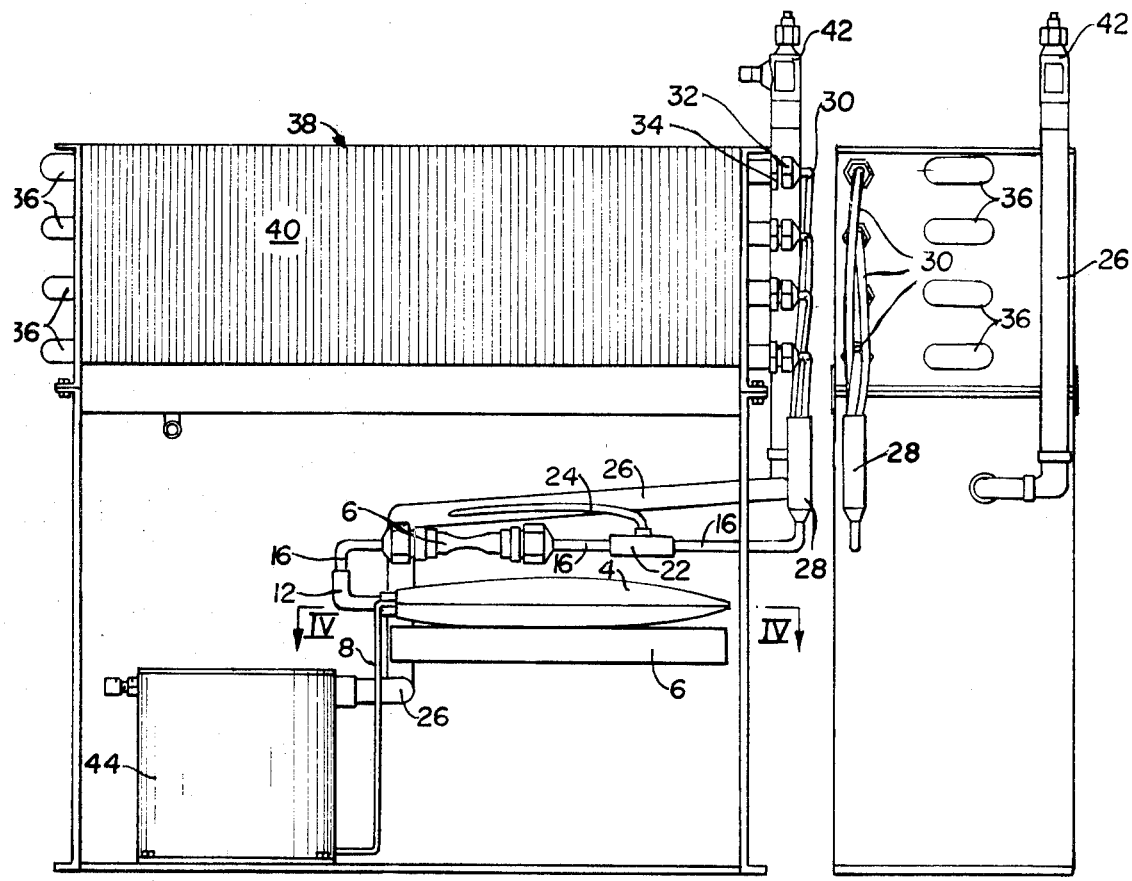
FIG. 2 is a front elevation of apparatus in accordance with the invention.
FIG. 3 is a side elevation view of apparatus in accordance with the invention.
Figure 4:
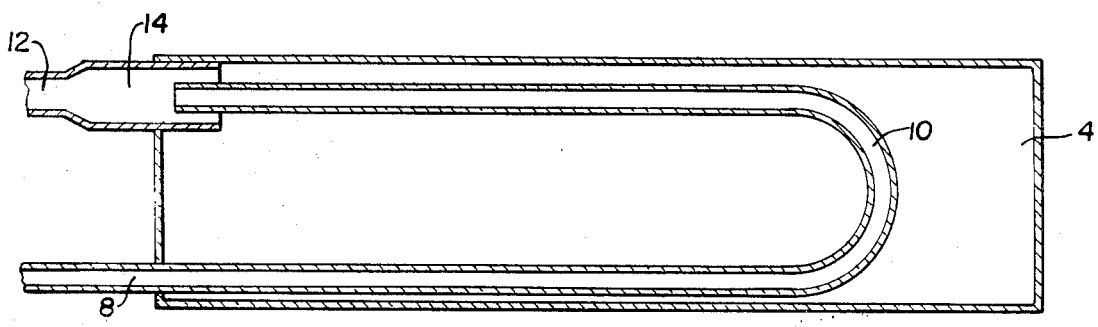
FIG. 4 is a section view taken on the line IV—IV in FIG. 2.

Referring to FIGS. 1–3, inclusive, there is shown a refrigeration apparatus 2 in accordance with the present invention. This comprises an activator unit 4, to which heat is supplied by means of a heating element 6, which may be electrically operated and of conventional construction. As seen from FIGS. 2 and 4, the activator 4 has a supply pipe 8 which runs for a substantial distance interiorly thereof, having a curve as at 10 and discharging into a pipe 12 having an enlarged portion 14, to permit mixing of fluid in the line 8 with that contained in the body of the activator 4. The line 12 communicates with the line 16 containing a sight glass 18 secured therein by couplings 20 and a T 22, to provide for the off-take of a Venturi line 24, the other end of which is joined with a downcomer pipe 26, as hereinafter more fully explained. The line 16 communicates with a supply spider 28, issuing from which is a plurality of lines 30 that communicate by means of metering nuts 32 with ports 34 leading to the coils 36 of the expansion unit 38, which is preferably provided with fins 40. The coils 36 further communicate, as best seen in FIG. 1, with the downcomer pipe 26, at the top of which, there is an off-take port 42.

As mentioned above, the line 26 is joined by the Venturi line 24 leading from the T 22. Preferably, the line 24 enters the line 26 in its substantially horizontal portion and discharges concentrically thereof.

The line 26 enters the storage tank 44, best seen in FIGS. 2, 5 and 6. Tank 44 has at 46 a suitable charge port and, internally thereof, one or more suitable loops of pipe 48 that draw fluid from the vicinity of the bottom of the tank 44, where the fluid is colder, heating the fluid by contact with warmer fluid in the tank 44 near the top thereof before discharging it to the line 8 leading to the activator unit 4.

Charging apparatus with refrigerant

A partial vacuum of 25 p.s.i. is drawn on the exhaust port 42, and refrigerant composition in the liquid state is drawn into the system through a line suitably purged with refrigerant liquid into the intake port 46 in the tank 44. The charging operation proceeds somewhat slowly, sometimes stopping altogether for five or ten minutes three or four times during the charging operation, possibly as a result of intermittent freezing and thawing of the refrigerant composition as it passes through the intake port 46. When the entire system is completely filled with refrigerant liquid, as may be determined with the aid of the sight glass 18, the ports 42 and 46 are closed, and operation of the apparatus is started.

Operation of the apparatus

Initially, the heating unit 6 draws 450 watts of electrical current, but after an initial period of several minutes, the heating unit 6 is controlled to a final base operating temperature at which it draws 50 watts of current. Refrigerant composition circulates throughout the system. Pressure is built up in the activator 4, and pressurized refrigerant is supplied not only to the Venturi line 24 but also to the ports 34 leading to the cooling unit coils 36. Within the cooling unit coils 36, the refrigerant composition expands, extracting heat from the ambient air. It will be within the skill of the art, with a minimum of experimentation, to arrive at proper sizes for the lines and valves, taking into account the considerations that (1) for a unit of larger capacity, other things being equal, more refrigerant and greater tube diameters and valve sizes will be required, (2) smaller valve openings in the meters 32, other things being equal, cause a greater buildup of pressure in the line 16 and, consequently, a greater cooling effect in the coils 36, with a lower operating temperature thus being reached, and (3) the flow of refrigerant through the system is importantly influenced by the dimensions of the Venturi line 24, a larger line tending to cause a greater Venturi effect and a correspondingly larger pressure drop in the cooling coils 36, with a resultant enhanced cooling effect and lower operating temperature. Ideally, the system affords low operating temperatures without the use of pumps and with equipment substantially more compact and inexpensive than has been hitherto known and used.

Most especially, it is desired that the operating temperature of refrigerant in the cooling coils 36 reach a low temperature, such as −50° F. to −200° F. The amount of heat extracted from the surroundings, other things being equal, is directly proportional to the temperature difference between the temperature of the cooling coils 36 and the surrounding temperature. When this is greater, a smaller unit can extract more heat per unit of time. Yet another factor, however, is that when such low operating temperatures are used, the efficiency of the system is still further improved by reason of the avoidance of the condensation of moisture from the ambient air on the cooling coils. With the cooling coils at, say, −100° F., the air in the immediate vicinity of them has been cooled to temperatures well below room temperature and has thus been deprived, before coming into contact with the cooling coils, of moisture contained therein. Apparatus according to the invention thus will develop frost only when it is starting up or shutting down. The start-up is sufficiently rapid that a minimum of frost forms during that period, but if desired, several measures can be taken to insure against the formation of frost during start-up, as by encasing the cooling coils and fins in dehumidified air during the start-up operation. In most instances, however, this will not be necessary, as the small amount of frost that forms during the start-up operation will disappear by evaporation in a short period of time.

When apparatus of the invention is used for air conditioning, rather than for refrigeration, it will be necessary (as those skilled in the art will readily appreciate) to provide means for mixing the very cold air produced by the apparatus with a suitable quantity of warmer air before delivering it to its sites of use. It is within the skill of the art to design suitable duct work and mixing means for this operation. For subzero refrigeration, the air from the cooling coils may, of course, be used directly.

I claim as my invention:

1. A refrigerant consisting essentially of a material in the liquid state at −40° F. in atmospheric pressure, said material being the result of the admixture without agitation at −40° F. of 1 part by volume of an aqueous ammonia solution with a crystalline substance at about −40° F. resulting from the admixture at room temperature of about 2 parts by volume of mineral oil with 1 part by volume of ethanol.

References Cited

UNITED STATES PATENTS

| | | | |
|---|---|---|---|
| 1,417,047 | 5/1922 | Eppley | 252—68 |
| 1,892,741 | 1/1933 | Sorenson | 252—67 |
| 2,163,899 | 6/1939 | Walker et al. | 252—69 |
| 2,301,839 | 11/1942 | Work et al. | 62—112 |
| 2,523,863 | 9/1950 | Cook et al. | 252—68 |

LEON D. ROSDOL, Primary Examiner

I. GLUCK, Assistant Examiner

U.S. Cl. X.R.

62—112; 252—67